US009997002B2

(12) United States Patent
Stirtz

(10) Patent No.: US 9,997,002 B2
(45) Date of Patent: Jun. 12, 2018

(54) KEY FOB WITH SLIDING LOCK STATUS INDICATOR

(71) Applicant: Ronald H. Stirtz, Creswell, OR (US)

(72) Inventor: Ronald H. Stirtz, Creswell, OR (US)

( * ) Notice: Subject to any disclaimer, the term of this patent is extended or adjusted under 35 U.S.C. 154(b) by 28 days.

(21) Appl. No.: 14/999,555

(22) Filed: May 23, 2016

(65) Prior Publication Data

US 2017/0337759 A1 Nov. 23, 2017

(51) Int. Cl.

*G05B 19/00* (2006.01)
*G07C 9/00* (2006.01)
*H01H 9/02* (2006.01)

(52) U.S. Cl.

CPC ....... *G07C 9/00944* (2013.01); *H01H 9/0235* (2013.01); *G07C 2009/00984* (2013.01); *G07C 2209/62* (2013.01)

(58) Field of Classification Search

None
See application file for complete search history.

(56) References Cited

U.S. PATENT DOCUMENTS

2006/0248931 A1* 11/2006 Boulard ................ E05B 13/004 70/208
2008/0129448 A1* 6/2008 Reichling .............. G08C 17/02 340/5.72
2010/0123549 A1* 5/2010 Lickfelt ............ G07C 9/00944 340/5.64
2010/0283581 A1* 11/2010 Heigl ...................... E05F 15/77 340/5.72

* cited by examiner

*Primary Examiner* — Adolf Dsouza
(74) *Attorney, Agent, or Firm* — Robert E. Howard

(57) ABSTRACT

A lock button status indicator for use with a key fob having depressable lock and unlock buttons for remotely activating a locking/unlocking mechanism communicating with a door, such as a vehicle door. The lock button status indicator has a cross member extending over the lock button in a first position and extending over the unlock button in a second position. Apparatus is provided for allowing the lock button status indicator to be manually moved back and forth between the first position and the second position. Apparatus is provided for releasably retaining the lock button status indicator member in either the first or second position.

6 Claims, 1 Drawing Sheet

KEY FOB WITH SLIDING LOCK STATUS INDICATOR

BACKGROUND OF THE INVENTION

The present invention relates to a lock status indicator for a key fob used for remotely locking and unlocking a vehicle door that informs the user after having left the vicinity of the vehicle whether the door lock button had been depressed to actuate the door lock.

The use of key fobs for remotely locking and unlocking vehicle doors has become almost universal. In its simplest form the key fob is a hand held device having a depressable button labeled "lock" or some similar label, and another depressable button labeled "unlock" or some similar label. Located within the key fob's case are the electronics and power source required to transmit a signal via a modulated radio frequency or via infrared to a receiver communicating with the lock/unlock mechanism of a door or doors of a vehicle upon depression of the "lock" or "unlock" button. Additional buttons, such as a "panic" button for activating the vehicle's horn as an alarm, may also be present.

After parking a vehicle and walking away to perform an errand, or for other reasons, a user often forgets whether the vehicle's door was locked at the time of departure by having depressed the "lock" button of the key fob. Rather than having to walk back towards the vehicle into a proximity where the lock button can be depressed to insure activation of the door lock, it would be desirable to have some indicator means associated with the fob itself to inform the user as to whether the lock button had indeed been depressed upon departing the vehicle.

There have been several suggestions in the prior art for key fobs that can indicate the status of a door lock in such a situation. Most are complex and expensive, involving electronic communication between a sensor in the door lock mechanism and a receiver in the key fob. See, for example, U.S. Pat. No. 8,362,898.

SUMMARY OF THE INVENTION

It is an object of the present invention to provide a simple and inexpensive lock button status indicator for use with a key fob having a depressable lock button and a depressable unlock button for remotely activating a locking/unlocking mechanism communicating with a door, such as a vehicle door.

The lock button status indicator includes a cross member extending over the lock button in a first position and extending over the unlock button in a second position.

Vertical side members extend downwardly from each end of the cross member. Rail members extend inwardly from the side members and are slidingly received within slots associated with the sides of the key fob case to thereby allow the lock button status indicator member to be manually moved back and forth between the first position and the second position.

Detent members releasably retain the lock button status indicator in either the first or second position.

In order to actuate the lock button, the cross member of the lock button status indicator must not be covering it. If it is, the detent members associated with the lock button are released and the lock button status indicator moved to a position over the unlock button where it is retained by detent members associated with the unlock button.

In order to actuate the unlock button, the cross member of the lock button status indicator must not be covering it. If it is, the detent members associated with the unlock button are released and the lock button status indicator moved to a position over the lock button where it is retained by detent members associated with the lock button.

The cross member of the lock button status indicator always leaves uncovered the lock or unlock button used last. Thus to determine if a vehicle door has been locked, examination of the key fob will show that it was locked if the lock button is not covered by the cross member of the lock button status indicator, or that it was not locked if the lock button is covered by the cross member of the lock button status indicator.

DESCRIPTION OF PREFERRED EMBODIMENTS

Figure 1:
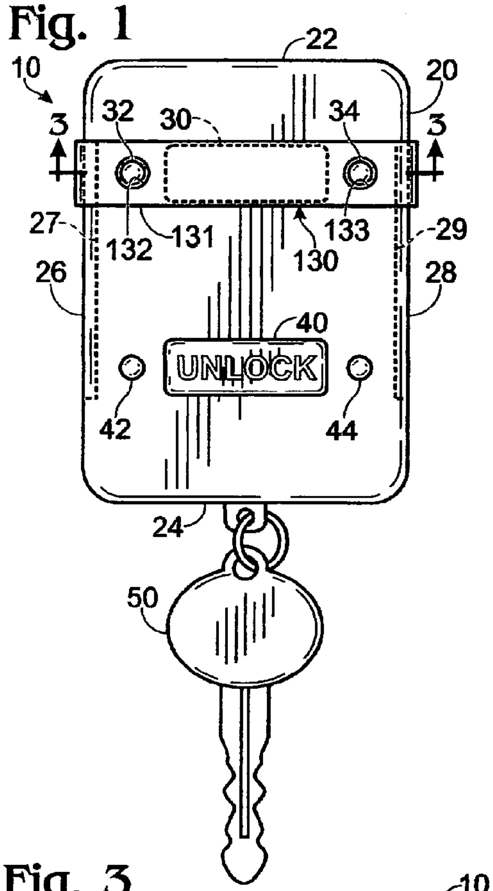
FIG. 1 is a front view of the key fob with the cross member of the status indicator shown covering the lock button.

Key fob 10 has a case 20 which contains the electronics and power source (not shown) required to transmit a signal via a modulated radio frequency or via infrared to a receiver communicating with the lock/unlock mechanism of a door or doors of a vehicle upon depression of the "lock" or "unlock" button to thereby lock or unlock the door or doors. Such elements are well known in the vehicle key fob art.

Case 20 of key fob 10 has a top 22, bottom 24, left side 26, and right side 28.

Key fob 10 has a "lock" function button 30 and an "unlock" function button 40. A vehicle ignition key 50 may be attached to fob 10, although with some vehicles, such as Mercedes Benz, a portion of the fob itself forms an electronic key for insertion into the ignition.

The generally rectangular shape of fob 10, and the arrangement and shape of the various buttons on key fob 10, shown in the drawings is for purposes of illustrating the invention. The key fob of the present invention may have many different shapes and the various buttons located thereon may take other arrangements or forms from that shown in the drawings. Additional buttons for other functions, such as a panic button for actuating a vehicle's horn as an alarm, may also be located thereon, as is well known in the prior art. Other words or indicia, such as symbols, may be substituted for the words "lock" and "unlock" to identify the function of these buttons.

Although the lock button 30 is shown being located above the unlock button 40, these positions could be reversed, or other function buttons located between them.

The lock status indicator 130 of the present invention is comprised of a horizontal cross member 131, left and right downwardly extending vertical side members 134 and 136, and left and right rail members 135 and 137 extending inwardly from left and right side members 134 and 135, respectively. Horizontal cross member 131 is preferably formed of a semi-transparent plastic.

Left and right rail members 135 and 137 are inserted into and slidingly engage elongated left and right slots 27 and 29, respectively, formed in the left and right sides 26 and 28 of case 20 of key fob 10. Slots 27 and 29 extend from a first location adjacent the lock button 30 to a second location adjacent the unlock button 40.

Left and right detent receiving openings 132 and 133, respectively, can extend partially or all the way through horizontal cross member 131, preferably towards the juncture of horizontal cross member 131 and left and right side members 134 and 136.

First and second lock detent members 32 and 34 are located in the upper surface of case 20 to the left and right of lock button 30 along its longitudinal axis, and form a first pair of lock detent members.

First and second unlock detent members 42 and 44 are located in the upper surface of case 20 to the left and right of unlock button 40 along its longitudinal axis, and form a second pair of lock detent members.

Detent members 32, 34, 42, and 44 are identical, and are of the ball and spring type well known in the detent art. Left and right detent receiving openings 132 and 133 of cross member 131 are configured to align with and releasingly receive the extended ball portions of the first pair of lock detent members 32 and 34 or said second pair of lock detent members 42 and 44, respectively, when positioned opposite thereto Although shown as extending from the upper surface of case 20, detent members 32, 34, 42, and 44 could extend from the sides 26 and 28 of case 20 in a position to the left and right of the area where the lock and unlock buttons 30 and 40 are located, with detent receiving openings being located in the vertical sides 134 and 136 of lock button status indicator 130.

Although it is preferred to use a pair of detent members with each of the lock and unlock buttons 30 and 40, a single detent member could be used with each.

As seen in FIG. 1, lock status indicator 130 can be placed over lock button 30 with the ball portions of first and second detent members 32 and 34 extending in releasable engagement into left and right detent receiving openings 132 and 133 (which are in alignment therewith). First and second detent members 32 and 34 releasably anchor lock status indicator 130 in position over lock button 30.

Figure 2:
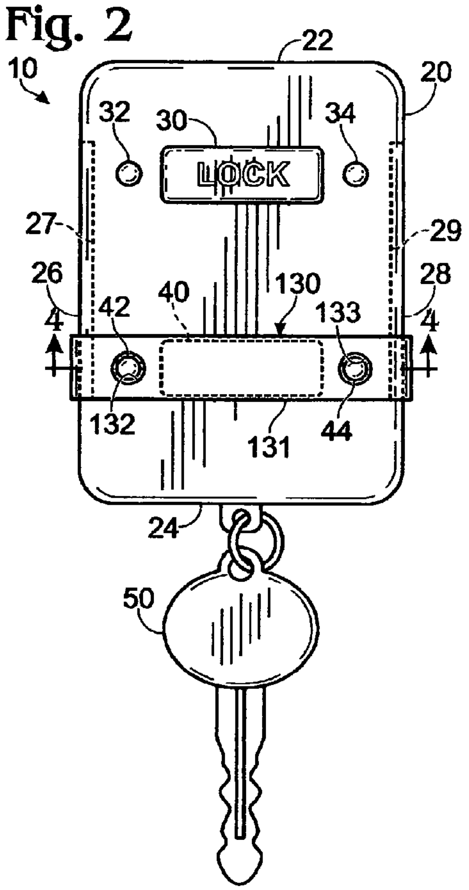
FIG. 2 is a front view of the key fob with the cross member of the status indicator shown covering the unlock button.
Figure 3:
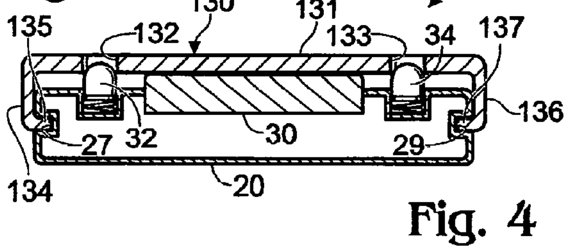
FIG. 3 is a view taken along line 3-3 of FIG. 1 of the key fob with the cross member the status indicator shown covering the lock button.
Figure 4:
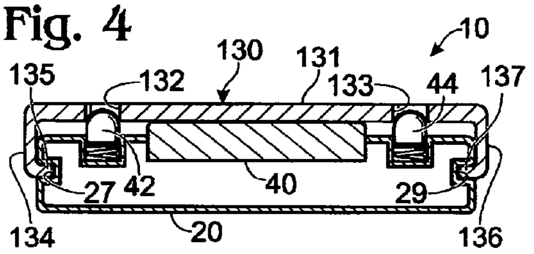
FIG. 4 is a view taken along line 4-4 of FIG. 2 of the key fob with the cross member the status indicator shown covering the unlock button.

To move lock status indicator 130 into position over unlock button 40, as seen in FIG. 2, the ball portions of first and second detent members 32 and 34 are manually depressed to disengage them from locking engagement with left and right detent receiving openings 132 and 133 of lock status indicator 130, and lock status indicator 130 manually slid downwardly until left and right detent receiving openings 132 and 133 lockingly engage the ball portions of first and second detent members 42 and 44 located adjacent unlock button 40.

In use, lock status indicator 130 is positioned to expose either the lock button 30 or the unlock button 40, depending upon which button the user desires to actuate.

For example, a user approaching his/her locked vehicle parked at home will wish to actuate the unlock button 40, and will, therefore need to move the lock status indicator 130 from its position over the unlock button 40 where it was last placed when the vehicle was parked and locked. (The uncovered lock button 30 indicates that the last use of key fob 10 was to actuate lock button 30 to lock the vehicle.) The status indicator 130 is moved from over the unlock button 40 to a position over the lock button 30 by depressing the ball portions of unlock detent members 42 and 44 and manually sliding status indicator 130 up and over lock button 30 until openings 132 and 133 of sliding status indicator 130 engage the ball portions of lock detent members 32 and 34. The unlock button 40 can then be depressed to unlock the vehicle door or doors, and the user can enter the vehicle and drive away.

Upon reaching his/her destination, the user exits the vehicle, and if he/she remembers to lock the vehicle, will have to move the lock status indicator 130 from over the lock button 30 (where it was last placed in order to actuate the unlock button 40) to over the unlock button 40 in order to gain access to the lock button 30. This is accomplished by depressing the ball portions of first and second lock detent members 32 and 34 and manually sliding lock status indicator 130 downwardly over the unlock button 40 until the ball portions of first and second unlock detent members 42 and 44 lockingly engage openings 132 and 133 of sliding lock status indicator 130. The lock button 30 can then be depressed to lock the vehicle door or doors before the user departs the vicinity of the vehicle.

After having placed some distance between the user and his/her vehicle the user may suddenly realize he/she cannot remember if the vehicle was left in a locked condition. To determine its locked or unlocked status the user can merely glance at the key fob 10 and determine the location of the lock status indicator 130. If lock status indicator 130 is covering the unlock button 40 the lock button 30 will be exposed, which indicates that the vehicle was locked upon departure. If lock status indicator member 130 is covering the lock button 30 and the unlock button 40 is exposed, it means that lock button 30 was not actuated and that the vehicle was left unlocked.

Although the invention has been described relative to a lock status indicator 130 that is adapted to slide from adjacent the top 22 of key fob 10 towards the bottom 24 thereof and back where lock button 30 and unlock button 40 are in vertical alignment, as shown in the drawings, it would be adapted to slide from adjacent left side 26 towards right side 28 and back if the lock and unlock buttons were positioned in horizontal alignment.

In the preferred embodiment shown in the drawings elongated slots 27 and 29 are shown as being formed in the sides 26 and 28 of case 20 of key fob 10. However, slots 27 and 29 could be formed in independent elongated members attached to the left and right sides 26 and 28 of case 20 by suitable attachment means, such as a pressure sensitive adhesive. Detent members would be located in the independent elongated members in the space above or below the slots and adapted to engage detent receiving openings located in the side members of a lock status indicator member similar to that described herein as lock status indicator 130. The latter alternative embodiment could be supplied as an after-market lock status indicator system employing the slightly modified lock status indicator 130 just described with an existing key fob.

While the invention has been described relative to a key fob 10 for remotely locking and unlocking a vehicle door having a lock button status indicator 130, it is clear that the lock button status indicator 130 of the present invention can be used with a key fob having a lock button for locking doors other than vehicle doors, such as entry and exit doors to buildings, garage doors, internally located security doors, etc.

It will be obvious to those having skill in the art that many changes may be made to the details of the above-described embodiments of this invention without departing from the underlying principles thereof. The scope of the present invention should, therefore, be determined only by the following claims.

The invention claimed is:

1. In a key fob having a case containing a depressable lock button for remotely locking a door and a depressable unlock button for remotely unlocking the door, an improvement comprising:

a lock button status indicator having a cross member extending over said lock button in a first position and extending over said unlock button in a second position;

means for allowing said lock button status indicator member to be manually moved back and forth between said first position and said second position; and means for releasably retaining said lock button status indicator member in either said first or said second positions.

2. The key fob of claim 1 wherein said cross member has left and right ends;

said means for allowing said lock button status indicator to be manually moved back and forth between said first position and said second position including left and right side members extending downwardly from said left and right ends of said cross member, respectively, said left and right side members having inwardly extending left and right rail members, respectively; and said case of said key fob having elongated slots associated therewith for slidably receiving said left and right rail members.

3. The key fob of claim 1 wherein said means for releasably retaining said lock button status indicator in either said first or second position is a ball and spring detent mechanism.

4. The key fob of claim 1 wherein said ball and spring detent mechanism includes a first pair of ball and spring detents associated with said lock button and a second pair of ball and spring detents associated with said unlock button.

5. The key fob of claim 4 wherein a first ball and spring detent forming said first pair of ball and spring detents is located to the left of said lock button along its longitudinal axis and a second ball and spring detent forming said first pair of ball and spring detents is located to the right of said lock button along its longitudinal axis, and wherein a first ball and spring detent forming said second pair of ball and spring detents is located to the left of said unlock button along its longitudinal axis and a second ball and spring detent forming said second pair of ball and spring detents is located to the right of said unlock button along its longitudinal axis.

6. The key fob of claim 5 wherein said cross member of said lock button status indicator has a pair of detent receiving openings configured to align with and releasingly receive an extended ball portion of said first or second ball and spring detents, respectively, when positioned opposite thereto.

* * * * *